Feb. 16, 1926.

N. E. METHLIN 1,573,354

HYDRAULIC DISTANT CONTROL APPARATUS

Filed July 8, 1924     7 Sheets-Sheet 5

Feb. 16, 1926. 1,573,354
N. E. METHLIN
HYDRAULIC DISTANT CONTROL APPARATUS
Filed July 8, 1924 7 Sheets-Sheet 6

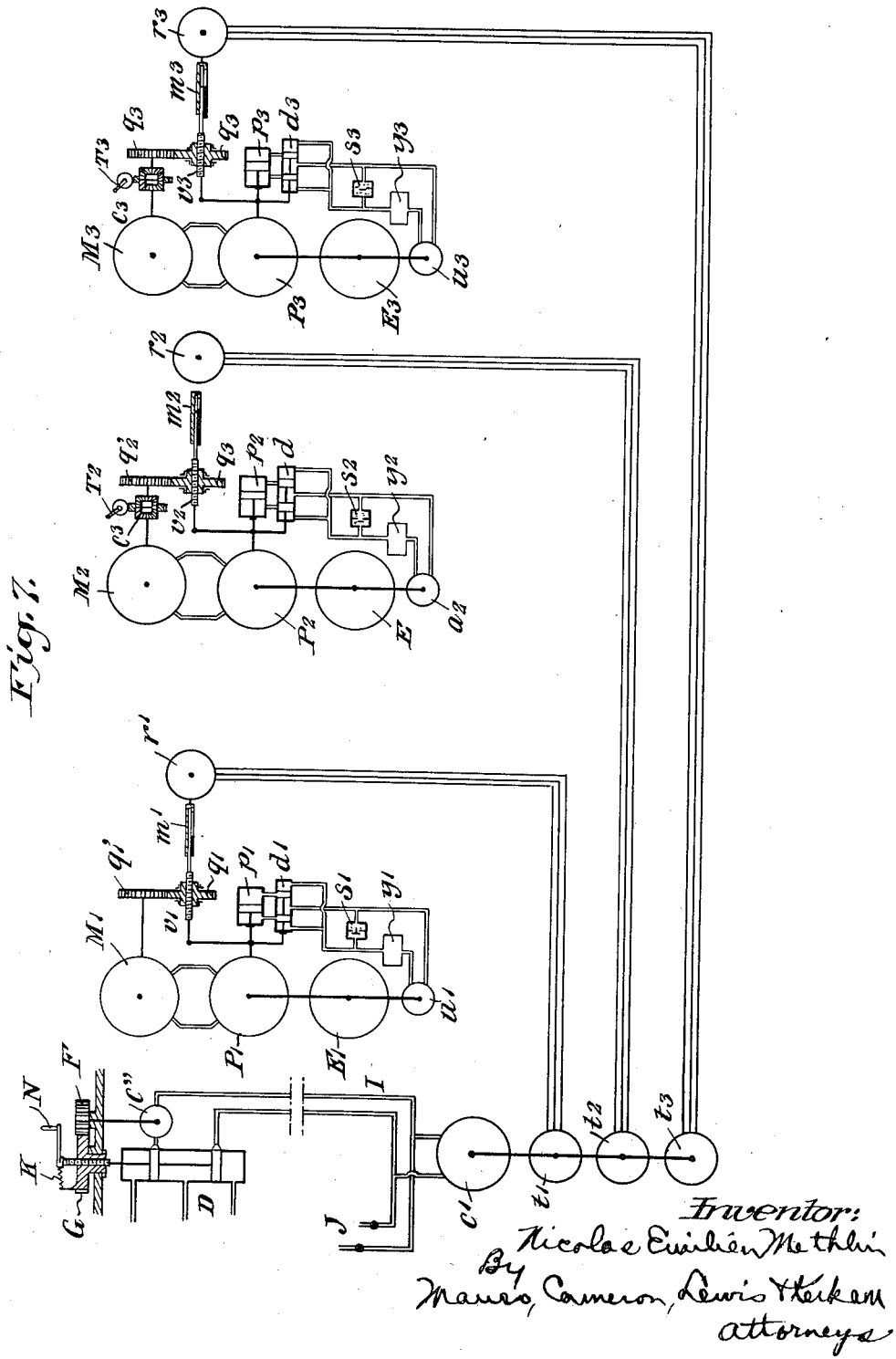

Patented Feb. 16, 1926.

1,573,354

UNITED STATES PATENT OFFICE.

NICOLAS EMILIEN METHLIN, OF PARIS, FRANCE, ASSIGNOR TO SCHNEIDER & CIE., OF PARIS, FRANCE, A LIMITED JOINT STOCK COMPANY OF FRANCE.

HYDRAULIC DISTANT CONTROL APPARATUS.

Application filed July 8, 1924. Serial No. 724,872.

*To all whom it may concern:*

Be it known that I, NICOLAS EMILIEN METHLIN, a citizen of the Republic of France, resident of Paris, France, have invented new and useful Improvements in Hydraulic Distant Control Apparatus, which are fully set forth in the following specification.

The present invention has for its object to provide improved apparatus for controlling from a distance the positioning of any devices into a definite position.

This invention is more particularly applicable to the control of the firing of guns on board warships. It allows more particularly of solving the problem of distant-control, which problem may be enunciated as follows: The automatic control from a central station of a group of guns in such a manner that the said guns shall remain always parallel to one another in their common movements whilst allowing the gun servers placed next the guns, to move each of these guns separately for the purpose of making the necessary corrections (such as parallax, aiming, adjusting etc.) by following for this purpose the indications given by a control device which shows at every moment the deviation existing between the position occupied by the gun and the position the latter should occupy in order that the laying of the gun shall be absolutely accurate.

In the accompanying drawings the diagrammatic Figure 1 illustrates by way of example a constructional form of this invention for the particular case of the distant control of the training of two guns.

Figures 5, 6 and 7 are views illustrating other modifications of the invention which can be advantageously employed in certain particular cases.

Figure 1:
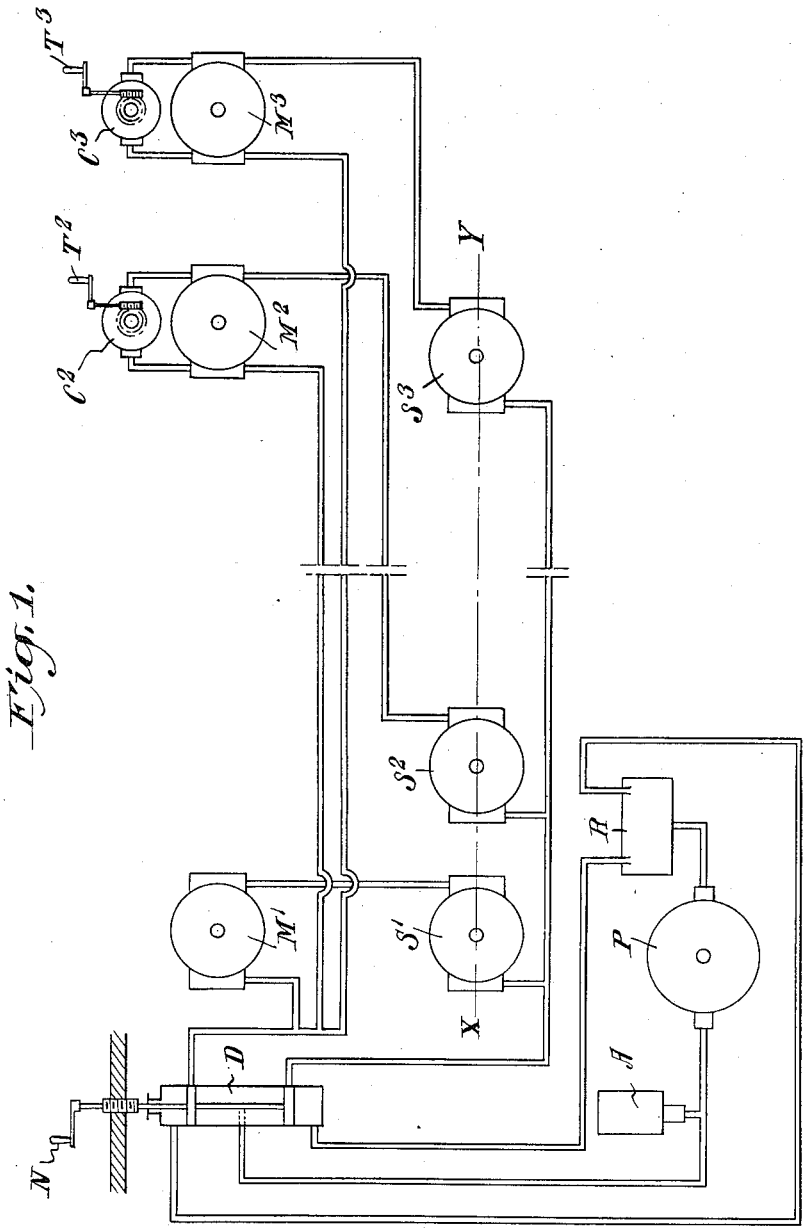

In Figure 1:—A is an accumulator into which a pump P delivers water, or, preferably oil, drawn from a sump R.

D is a distributing cylindrical slide valve situated at the central station, the screw-threaded rod of which is actuated by a gun-layer by means of a hand crank N fixed on the said rod.

$M^1$ is a hydraulic motor, assumed to be of a rotary type, employed for moving the sighting telescope at the central station.

$M^2$, $M^3$ are motors identically similar to the motor $M^1$, which are employed for producing the movements of the guns.

$S^1$, $S^2$, $S^3$ are three auxiliary motors identically similar to the motors $M^1$, $M^2$, $M^3$; they are fed respectively in series with the motors $M^1$, $M^2$, $M^3$, and are coupled mechanically together on a common shaft X—Y.

$C^2$, $C^3$ are two small rotary pumps mounted in a by-pass connection with the motor $M^2$, $M^3$; they can be actuated by means of a non-reversible gear, by operating the hand cranks, $T^2$, $T^3$.

This improved apparatus operates as follows:—

The common movements are controlled by the gun layer at the central station who actuates the hand-crank N of the distributor D. In these movements the parallelism between the sighting telescope at the central station and the guns is assured by the group of auxiliary motors $S^1$, $S^2$, $S^3$ which constitutes a synchronizing regulating relay. It will be readily perceived that the mechanical coupling together of these three last-mentioned motors (which operate also as regulating relays because they reinforce automatically the pressure acting upon the most highly loaded motors) has the result of equalizing their deliveries, and that their being mounted in series with the motor $M^1$, $M^2$, $M^3$ assures the synchronization of these latter.

It is to be noted that the operation of the synchronizers $S^1$, $S^2$, $S^3$, does not entail practically any loss of power in the distant-control apparatus.

In order to make the necessary corrections, for instance a correction for parallax, or for correcting the laying of the guns (for example after the gun has become deviated as a result of the firing of the shot), the local gun servers actuate the handwheels $T^2$, $T^3$, in accordance with the indications of the control devices which are not shown in the diagram and which may consist for instance of an electric transmission gear of a known type.

The compensating pumps $C^2$, $C^3$ may obviously be actuated by hand or by means of any suitable motor. They may likewise be constituted by a combination comprising a constant-speed electric motor and a pump having a delivery variable in amount and in direction.

More generally speaking the compensating devices $C^2$, $C^3$ may be constituted by a device or a group of devices capable of imparting an individual movement to one of the receiving devices. They may therefore be replaced by simple mechanical differentials interposed between the shafts of the motors $M^2$, $M^3$ and the devices to be controlled. This solution is however not so good owing to the "plays" that are practically unavoidable.

It is to be noted that the distributor D may be driven by the satellite wheels of a differential whose two pinions are actuated respectively by the gun-server who is operating the telescope at the central station (known as the distant-control gun-layer) and by the motor $M^1$. It is further to be noted that the distributor D, the accumulator A and the pump P may be replaced in the known manner by a combination comprising a constant-speed electric motor and a pump having a delivery variable in amount and direction. Finally it is to be noted that the auxiliary motor $S^1$ may be dispensed with on the condition that the auxiliary motors $S^2$ and $S^3$ are coupled mechanically to the motor $M^1$.

In order to simplify the explanations, it is assumed that the motors $M^1$, $M^2$, $M^3$, $S^1$, $S^2$, $S^3$, are identically similar; but this assumption is not absolutely necessary. It is obvious that in particular the motor $M^1$ for instance may be replaced by a motor having an $n$-times smaller power-output per revolution on condition that the ratio of the mechanical transmission interposed between the shaft of the motor $M^1$ and the sighting telescope is suitably modified, or on condition that the auxiliary motor $S^1$ is replaced by a motor itself having an $n$-times smaller power-output per revolution.

In order to allow of making-up any leakage losses, it is advisable in practice to employ as auxiliary motors $S^1$, $S^2$, $S^3$, motors whose power-output per revolution can be regulated with precision according to requirement.

By installing, near one of the guns, a distributor whose pipes can be connected in parallel with those of the distributor D, a central safety station will be provided which can be used immediately on the occurrence of damage to the main station, this latter being then isolated by operating stop-cocks.

Figure 2:
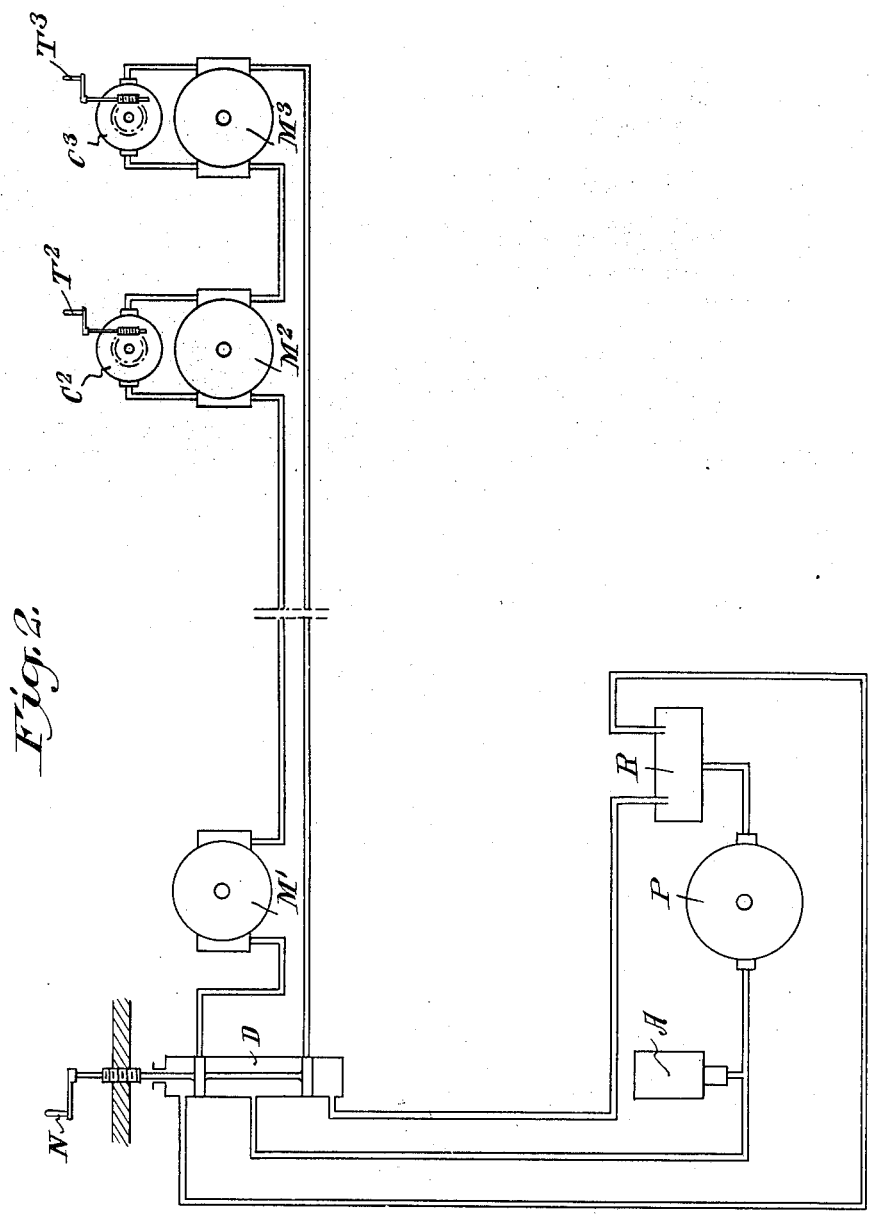
Figure 2 illustrates a modification of the apparatus shown in Figure 1.

Figure 2 illustrates a modification wherein the motors $M^1$, $M^2$, $M^3$, instead of being fed in a by-pass, are mounted in series. It is obvious in this case that the synchronizers $S^1$, $S^2$, $S^3$, may be dispensed with. The installation is more simple, but less general in its application, because it entails an increase in the pressure that is proportional to the number of receivers. The installation is further more vulnerable, because it would be completely paralyzed in the case of damage happening to the single line of piping, whereas it is always an easy matter, in the case of the installation shown in Figure 1, to isolate, by operating stop-cocks, the particular portion of the installation that may have become accidentally put out of service.

Figure 3:
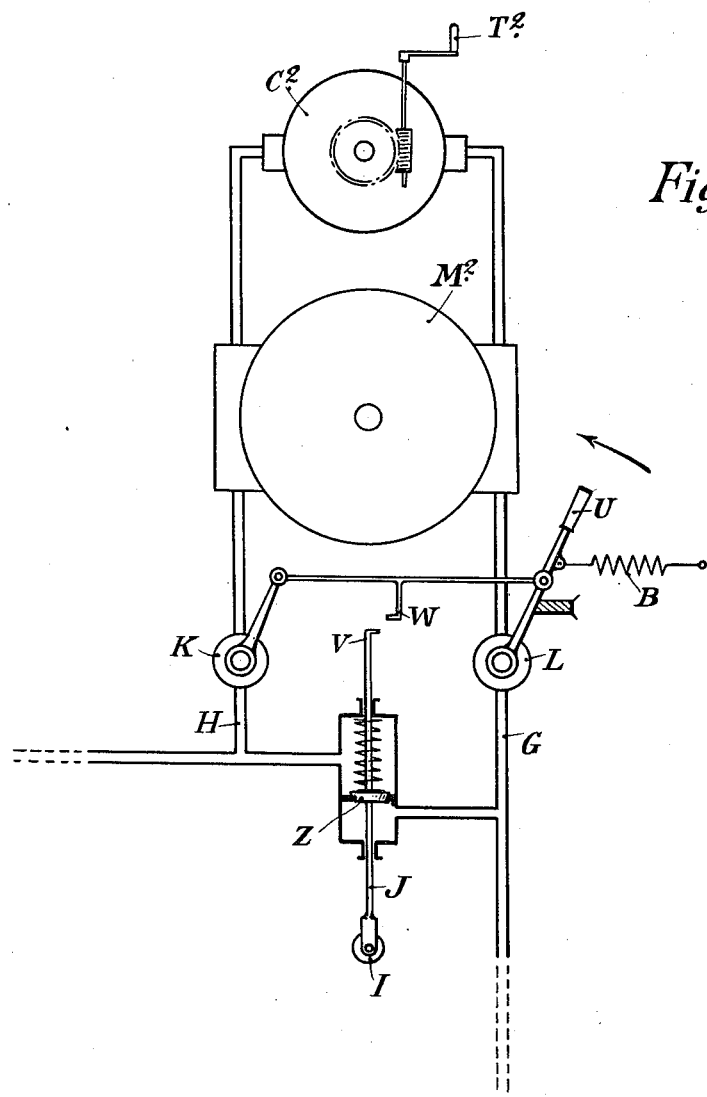
Figure 3 illustrates a constructional detail.

Figure 3 illustrates an apparatus which may be employed when the guns have not the same field of fire, for the purpose of producing an automatic stoppage of the guns that have reached the limit of their field of fire, whilst leaving the other guns in service, as well as in order to allow of replacing in service guns that have been temporarily stopped, immediately the target has become again within their field of fire.

In Figure 3:—$M^2$ is one of the motors for driving the guns, $C^2$ is the corresponding compensating pump, and $T^2$ is its operating hand crank, all as in Figure 1.

Z is a valve which normally is kept closed by the spring F, but which, when open, allows of establishing free communication between the pipes G and H leading to the motor $M^2$. The opening of this valve is effected automatically, when the gun arrives at the limits of its field of fire, by the action of cams which are carried along by the said gun in the movement of the latter, and which are designed to push upwards the roller I that is mounted on the rod J secured to the valve Z. It will be immediately perceived that the opening of the valve Z produces a stoppage of the motor $M^2$ without causing any disturbances in the working of the other motors.

The replacing in service of the motor $M^2$, which is assumed to have been stopped automatically, is effected in the following manner:—

Immediately the indications of the control device show the gun-server that the target has come back into the field of fire, the said gun-server actuates temporarily the lever U so as to close the cocks K and L fitted in the pipes H and G, and which are normally kept open by the spring B. This operation allows the gun-server to operate the motor $M^2$ by actuating the handcrank $T^2$ so as to bring back the gun to bear upon the target again, and it is then sufficient to release the lever U in order that the working shall become normal again.

W is a stop-tappet which, at the moment of the closing of the cocks K, L, comes underneath the hook V so as to hold the valve Z temporarily open.

In order that the accidental blocking of one of the guns shall not entail the stoppage of the working of all the other guns, it is sufficient to provide, in parallel with the valve Z, a second safety valve adapted to open in the reverse direction.

Figure 4:
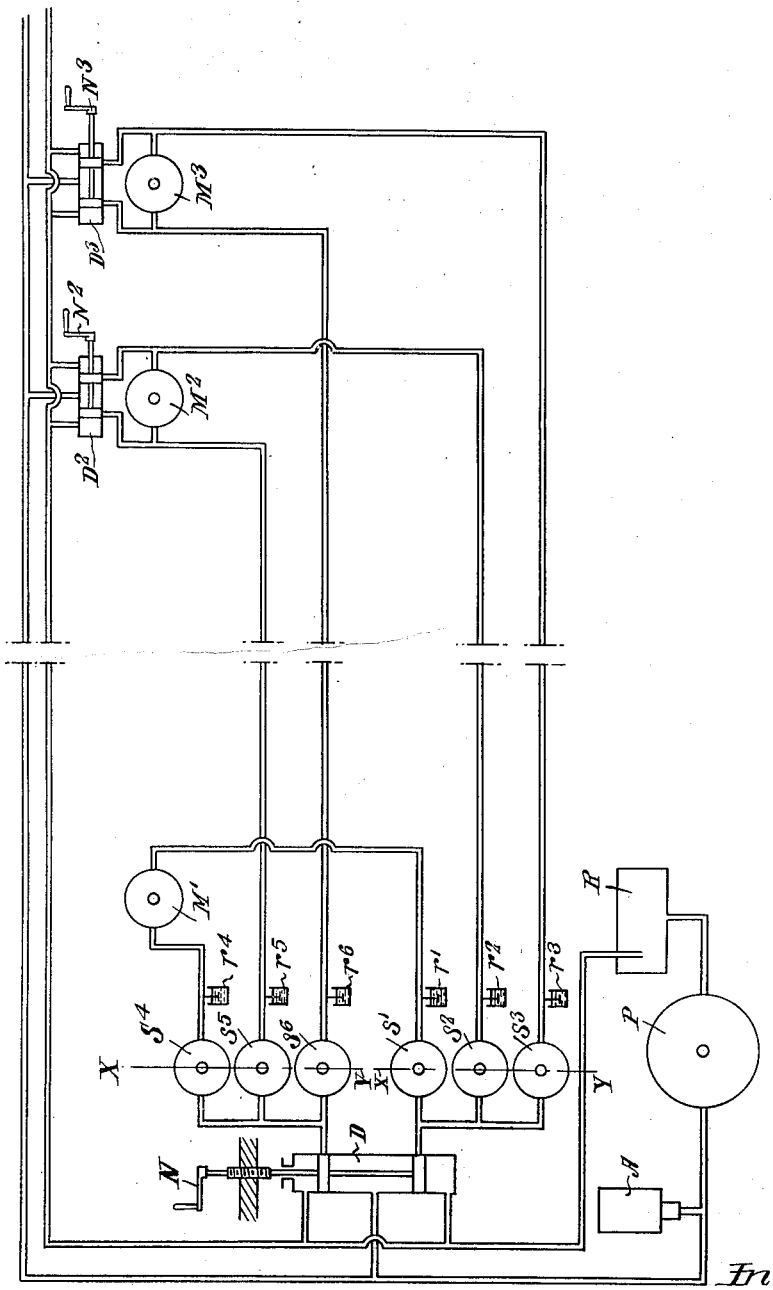
Figure 4 is a diagrammatic view illustrating another embodiment of the arrangement shown in Figure 1.

In Figure 4 wherein the letters A, P, R, D, N, $M^1$, $M^2$, $M^3$, $S^1$, $S^2$, $S^3$, X—Y have the same significance as in Figure 1, $S^4$, $S^5$, $S^6$ are three auxiliary motors identically similar to the motors $S^1$, $S^2$, $S^3$. These motors are coupled together mechanically on a common shaft X'—Y' which may be independent of, or be secured to the shaft X—Y. These motors are fed in series with the motors $M^1$, $M^2$, $M^3$, and are interposed in the delivery pipe of the distributor D which in the above described apparatus terminates directly at the motors $M^1$, $M^2$, $M^3$.

$r^1$, $r^2$, $r^3$, $r^4$, $r^5$, $r^6$ are shifting devices constituted in a known manner by valves submerged in oil, and they open on the occurrence of a drop in pressure in the pipes connecting the main motors M to the auxiliary motors S.

$D^2$, $D^3$ are two auxiliary distributors which can be operated by actuating the hand-cranks $N^2$, $N^3$. These distributors are fed either directly by the pump P as shown in Figure 4, or by a special pump producing a pressure that is at least equal to but is, preferably greater than, the pressure produced by the pump P.

In comparison with Figure 1, the apparatus of the present invention comprises the following improved features.

The introduction of a second synchronizing group designed to supply the symmetry that is absent in the main patent;

Replacing the compensating pumps $C^2$, $C^3$ by distributors; and

The fitting of shifting devices on the pipes that connect the synchronizing motors with the main motors.

The advantages resulting from these improved features are the following:—

1. The working of the improved distant-control apparatus is identically the same irrespectively of the direction in which the motors are rotated.

2. In the case where one of the main motors may by way of exception, have to overcome a high resisting torque, the action of an excess pressure regulating relay is always amply assured by one or other of the two groups of synchronizing motors, whereas the apparatus described first hereinbefore assures this action only by suction up to the establishment of a vacuum when the single synchronizing group is brought into communication with the exhaust by the operation of the distributor D.

3. The bulkiness of the devices to be installed near the gun is considerably reduced.

4. The work of the gun servers is rendered much easier and therefore is performed with greater precision.

5. All cavitation and all entry of air are avoided.

All the modifications referred to in Figures 1 to 3, may be combined with the apparatus illustrated in Figure 4. In particular it is to be noted that the distributor D, the accumulator A, and the pump P may be replaced by a constant-speed electric motor driving a pump having a delivery variable in amount and direction. It is further to be noted that the speed of this pump can be regulated from a distance by employing an auxiliary control device of known type. It is also obvious that in this case the auxiliary distributors $D^2$, $D^3$, should be fed by a special pump.

Figure 5:
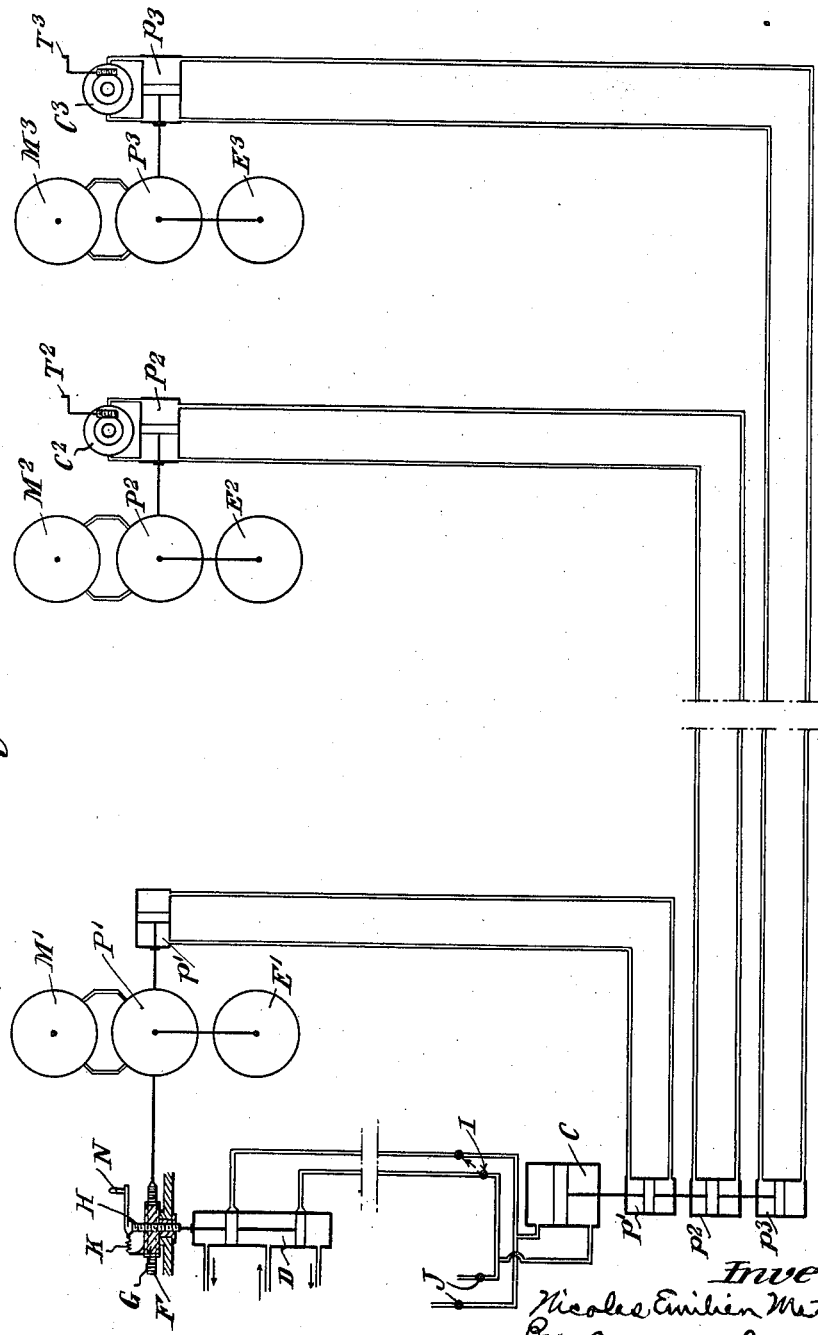
Figure 6:
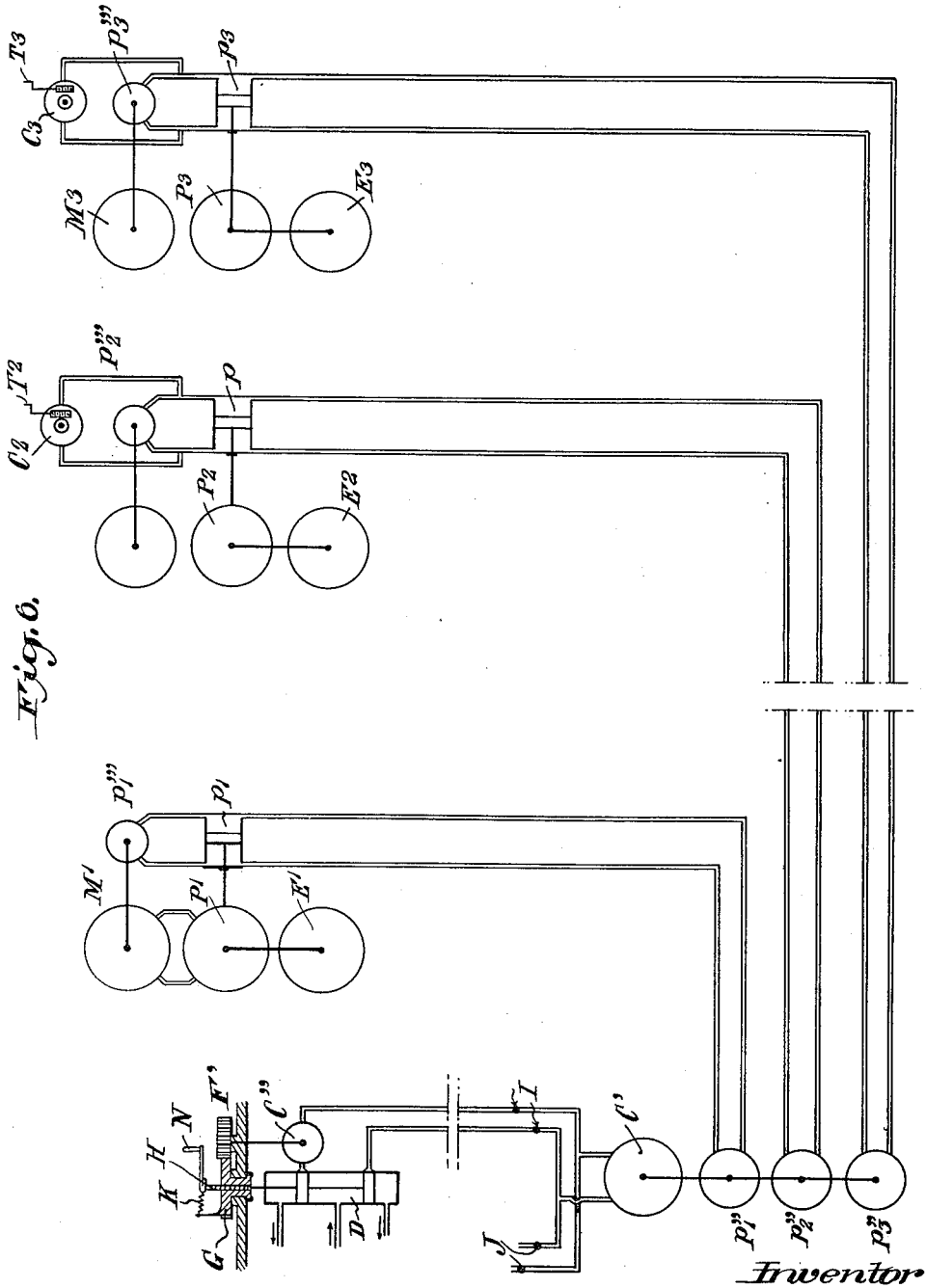

Referring to Figures 5 to 7 inclusive, each receiving motor is fed separately by a motor pump combination comprising a constant speed electric motor acting upon a pump having a delivery which is variable in amount and in direction, the electric motors being synchronized and the devices that regulate the delivery being moved simultaneously through equal amounts.

It is to be noted that if the above conditions are realized each motor ($M^1$, $M^2$, $M^3$) actuating a receiving device will receive, as so provided with reference to Figures 1 to 3, the same volume of liquid without there being any necessity to adopt the adjunction of any synchronizing group.

In order to reduce the lengths of the main lines of piping it will be advantageous to arrange each of the motor pump combinations near the hydraulic motor that corresponds to it. The movement of the devices that regulate the delivery of each pump may be effected by any suitable transmission gear of mechanical, hydraulic or electric type, or again by a mixed transmission gear, for instance of an hydro-electric type.

It will be generally advisable to provide for the intervention of a central auxiliary motor which can act either directly or through the medium of local auxiliary motors allotted to each of the pumps. The speed of the actuating motors ($M^1$, $M^2$, $M^3$) may depend either on the position of the controlling hand crank N of the central station (simple control), or upon the speed of actuation of the said hand crank (dependent control). The compensating pumps $C^2$ $C^3$ may be arranged in such a manner as no longer to act directly upon the actuating motors $M^2$, $M^3$, but upon a press driving the device that regulates the delivery of the corresponding pumps, and this action may be exerted either directly, or, if required, through the medium of a local auxiliary motor.

In the accompanying drawings the diagrammatic Figure 5 illustrates by way of example first the manner in which the apparatus specified in Figures 1 to 3 may be constructed in practice by utilizing an independent hydraulic central control device acting upon the devices that regulate the delivery through the medium of a central hydraulic auxiliary motor.

The diagrammatic Figure 6 illustrates by way of a second example the manner in which the same apparatus may be constructed in practice by employing a dependent central hydraulic control device acting upon the devices that regulate the delivery through the medium of a central auxiliary hydraulic motor.

The diagrammatic Figure 7 illustrates by way of a third example the manner in which the same apparatus may be constructed in practice by employing a central hydraulic control device acting upon the delivery regulating devices through the medium of a central auxiliary hydraulic motor controlling through an electric transmission a plurality of local hydraulic auxiliary motors.

In Figures 5 to 7, $M^1$ is a hydraulic motor, assumed to be of the rotary type, employed for moving the sighting telescope of the central station.

$M^2$, $M^3$ are motors assumed to be identically similar to the motor $M^1$; they are employed for producing the movements of the guns.

$P^1$, $P^2$, $P^3$ are three identically similar pumps of variable delivery supplying respectively each of the motors $M^1$, $M^2$, $M^3$.

$p^1$, $p^2$, $p^3$ are three double-acting presses for producing the movements of the devices that regulate the delivery of each of the pumps $P^1$, $P^2$, $P^3$.

$E^1$, $E^2$, $E^3$ are three identically similar synchronizing electric motors for driving each of the pumps $P^1$, $P^2$, $P^3$.

Each of these motors may be constituted for instance by a switch in such a manner as to allow of starting on direct current, then effecting synchronization by closing the interrupter or cut-out connected to the alternating current network.

N is the hand crank at the central station.

In the example shown in Figure 5 the hand crank N acts upon the pistons of the distributing slide valve D by means of the screw-threaded spindle H which screws into the pinion G meshing with a rack F secured to the device for regulating the delivery of the pump $P^1$. A spring K has a tendency to maintain the hand crank N in a determined position in relation to the pinion G. The complete opening and closing of the distributor are effected for a relative movement of the hand crank N relatively to the pinion G of less than 180°. Two stops limit the said movement to the said amount.

The distributor D supplies a double-acting press C, and the rod of this press C drives three small double-acting presses $p'_1$, $p'_2$, $p'_3$ the ends of which are connected respectively to the ends of the presses $p^1$, $p^2$, $p^3$. The connections are made such that the movements of the rack F have a constant tendency to close the distributor, and consequently it will be perceived that by moving the hand crank N a proportional and simultaneous movement of the pistons of the presses $p^1$, $p^2$, $p^3$ is produced.

To each position of the hand crank N there will therefore correspond a determined speed of the motors $M^1$, $M^2$, $M^3$ since the motors $E^1$, $E^2$, $E^3$ revolve synchronously.

It is to be noted that there is no relation of dependency between the position of the receiving devices driven by the motors $M^1$, $M^2$, $M^3$ and the position of the hand crank N, and that in order to bring the motors $M^1$, $M^2$, $M^3$ to rest, it is necessary to replace the hand crank N into a determined position in relation to the frame of the apparatus.

The sighting station may comprise only the distributor D, because the presses C, $p'_1$, $p'_2$, $p'_3$ may be situated at any desired point of the ship.

Any desired change of the sighting station can be effected very simply by closing the cocks I and opening the cocks J which establish communication between the distributor of one of the auxiliary sighting stations.

The operation of these cocks is also conjugated with the operation of the interrupters that produce the corresponding permutation in the electric transmitters that assure the distant-control. No abrupt movement or shock is to be feared in the course of the manœuvre of changing the sighting station, because all the hand cranks N of the auxiliary stations which are not in service are automatically maintained in concordance with one another by springs K, and the position which these hand cranks must occupy in order to bring the motors $M^1$, $M^2$, $M^3$ to rest remains always the same.

It is to be noted that the rack F may be actuated by an auxiliary press mounted in series with the presses $p^1$ and $p'_1$.

It will also be noted that each of the presses $p^1$, $p^2$, $p^3$ receives the same volume of liquid as is the case hereinbefore described.

The presses $p^2$, $p^3$, may also receive complementary movements by the operation of the compensating pumps $C^2$, $C^3$ which are actuated by gun servers by means of hand cranks $T^2$, $T^3$ as hereinbefore described.

Relatively to those that are described in

Figures 1 to 4 this solution has the advantage of reducing the weight of the gun and the length of the piping.

In the example illustrated in Figure 6 the hand crank N acts upon an auxiliary hydraulic motor similar to the motor of the foregoing example, comprising a distributor D, a main hydraulic motor $C'$ a repeating hydraulic motor $C''$ mounted (as in the arrangement shown in Figure 2) in series with the motor $C'$, a pinion $F'$ mounted on the shaft of the motor $C''$, a pinion G meshing with the pinion $F'$, and a screwthreaded spindle H adapted to screw into the pinion G and driving the pistons of the distributor D.

The connections are made such that the pinion $F'$ will move the pinion G in the same direction as the hand crank N is being rotated, so that it will be immediately perceived that by rotating the hand crank N at a predetermined speed the motors $C'$ and $C''$ will be caused to rotate at a proportional speed.

The motor $C'$ drives three pumps $p''_1$ $p''_2$, $p''_3$ which are connected respectively to the ends of the presses $p^1$, $p^2$, $p^3$. The ends of these presses are connected further to three pumps $p'''_1$, $p'''_2$, $p'''_3$, that are driven respectively by the motors $M^1$, $M^2$, $M^3$ and the connections are made such that the action of the pumps $p'''_1$, $p'''_2$, $p'''_3$ opposes the action of the pumps $p''_1$, $p''_2$, $p''_3$.

By the arrangement shown in the figure, a relation of dependency is obviously established by a hydraulic differential which assures proportionality between the speed of the hand crank N and the speed of the motors $M^1$, $M^2$, $M^3$.

It is to be noted that the substitution of the hydraulic differential for the mechanical differentials generally employed for establishing relations of dependency provides a solution of the problem of doing away with all play and all wear in the transmissions.

The auxiliary pumps $C^2$, $C^3$ actuated by the hand cranks $T^2$, $T^3$ operate in the same manner as in the example shown in Figure 5.

Any desired change of the sighting station is effected as before by closing the cocks I and opening the cocks J.

It is to be noted that the pump $C''$ may be dispensed with if the motor $M^1$ be used for rotating the pinion $F'$.

In the example shown in Figure 7, the control of the motor $C'$ by the hand crank N is effected in exactly the same manner as in the arrangement shown in Figure 6. The hydraulic motor $C'$ controls three electrical transmitters $t^1$, $t^2$, $t^3$ which may be of any known type and which drive three electrical receivers $r^1$, $r^2$, $r^3$.

The receivers $r^1$, $r^2$, $r^3$ act upon the devices for regulating the delivery, through the medium of an auxiliary hydraulic motor of any known type comprising the presses $p^1$, $p^2$, $p^3$, the distributors $d^1$, $d^2$, $d^3$, and the jointed rods actuated by the receivers $r^1$, $r^2$, $r^3$. The action of the receivers is transmitted to these rods by means of grooved and keyed sleeves $m^1$, $m^2$, $m^3$ which are adapted to slide on longitudinal extensions of three screwthreaded spindles $v^1$, $v^2$, $v^3$ screwing into the pinions $q^1$, $q^2$, $q^3$.

The relation of dependency for assuring proportionality speed of the hand crank N and the speed of the motors $M^1$, $M^2$, $M^3$ is established by causing the pinions $q^1$, $q^2$, $q^3$ to be driven by the pinions $q'_1$, $q'_2$, $q'_3$ mounted on the shafts of the motors $M^1$, $M^2$, $M^3$. The compensating pumps $C^2$, $C^3$ have been replaced by differentials $C'_2$, $C'_3$.

Each local auxiliary hydraulic motor is fed by a small pump $u^1$, $u^2$, $u^3$; and during the stoppages the liquid is returned by a discharge valve $s^1$, $s^2$, $s^3$ into tanks $y^1$, $y^2$, $y^3$.

This solution has the advantage of enabling all the piping employed in the arrangement shown in Figures 5 and 6, for connecting the receiving stations to the stations of the central auxiliary motor, to be replaced by electric leads.

As a modification, it may be noted that the distributor D may be replaced by a small motor pump set comprising a constant speed electric motor and a pump of variable delivery the regulating device for which would be controlled like the pistons of the distributor D.

It will be perceived that in Figures 5 and 6 the combination $M^1$—$P^1$—$E^1$ may be dispensed with, and the sighting telescope may be driven directly by the motor $C''$ whose speed is proportional to the speed of the motor $M^1$. It will also be advantageous in that case to feed the motor $C''$ by a special pump such as the pump $p''$ (Fig. 6) driven by the relay $C'$ so that all the sighting stations will have their telescopes always laid on to the target.

The corrections for the gaps in the working of the various auxiliary motors may be made by the local gun servers in accordance with the indications of the control devices; but these corrections might be made equally well by measuring them as a function of the angular difference of positions of the hand crank N in relation to the pinion G, and interpolating them by means of a cam acting through a differential upon the laying of the sighting telescope.

Finally, it will be perceived that in the case illustrated in Figure 6, the pumps $P^1$, $P^2$, $P^3$, the electric motors $E^1$, $E^2$, $E^3$ and the pumps $p'''_1$, $p'''_2$, $p'''_3$ may be dispensed with, and that the pumps $p''_1$, $p''_2$, $p''_3$ may be connected directly to the motors $M^1$, $M^2$, $M^3$ But the simplification which this last modification would appear to effect, is only apparent, because it would obviously require a very considerable increase in the power of the pumps $p''_1$, $p''_2$, $p''_3$ of the motor C' and also in the power of the pump feeding the latter.

Having now particularly described and ascertained the nature of the said invention and in what manner the same is to be performed, what is claimed is:—

1. Apparatus for controlling one or more guns from a central station provided with a sighting telescope comprising, in combination, hydraulic means for moving said telescope, hydraulic means operatively connected to each gun to be controlled for moving the latter, means for transmitting equal volumes of liquid to each of said hydraulic means, and compensating means operatively connected to said second named hydraulic means for imparting complementary displacements to the latter.

2. Apparatus for controlling one or more guns from a central station comprising, in combination, central station hydraulic means, hydraulic means operatively connected to each gun to be controlled, means for transmitting equal volumes of liquid in the same time interval to each of said hydraulic means, and compensating means positioned adjacent each gun and operatively connected to said second named hydraulic means for imparting complementary displacements to said second named hydraulic means.

3. Apparatus for controlling one or more guns from a central station comprising a central station hydraulic motor, a hydraulic motor operatively connected to each gun to be controlled for imparting movement to the latter, means for transmitting equal volumes of liquid to each of said hydraulic motors, and compensating means operatively connected to the gun hydraulic motors for imparting complementary displacements to said last named motors.

4. Apparatus for controlling one or more guns from a central station provided with a sighting telescope comprising, in combination, a hydraulic motor for moving said telescope, a hydraulic motor operatively connected to each gun to be controlled, means for transmitting equal volumes of liquid to each of said hydraulic motors, manually operable means for controlling the operation of said last named means, and compensating means operatively connected to each of said gun motors for imparting complementary displacements to the latter.

5. Apparatus for controlling one or more guns from a central station provided with sighting means comprising, in combination, a hydraulic motor operatively connected to the sighting means for moving the latter, a hydraulic motor operatively connected to each gun for moving the latter, means including a distributor for transmitting equal volumes of liquid to each of said motors, manual means for actuating said distributor, and compensating means positioned adjacent each gun and operatively connected to the gun motors for imparting complementary displacements to said last named motors.

6. Apparatus for controlling one or more guns located at a distance from a central station provided with sighting means comprising, in combination, a hydraulic motor operatively connected to said sighting means for moving the same, a pump operatively connected to said motor, means for driving said pump, a hydraulic motor operatively connected to each gun to be controlled, a pump for each of said gun motors, means for driving said last named pumps, means including a distributor for controlling the supply of each of said pumps to each of said motors, whereby equal volumes of liquid are supplied to each motor, and compensating means operatively connected to each of the gun motors for imparting complementary displacements thereto.

7. Apparatus for controlling one or more guns located at a distance from a central station provided with sighting means comprising, in combination, a hydraulic motor operatively connected to said sighting means, means for actuating said motor, a hydraulic motor operatively connected to each gun to be controlled, means for actuating said gun motors, means including a manually operable control member, a distributor and power transmitting means for controlling the volumes of liquid delivered to said motors, said volumes being equal, compensating means operatively connected to each of said gun motors for imparting complementary displacements to the latter, and manually operable means for controlling said compensating means.

8. A distant control apparatus of the type wherein one or more guns are controlled from a central station provided with sighting means, and wherein order transmitting means are provided adjacent each gun for indicating the position of the gun relative to the position it should occupy, comprising a hydraulic motor operatively connected to the sighting means, a hydraulic motor operatively connected to each gun to be controlled, means for transmitting equal volumes of liquid to each of said motors, manually operable means positioned at the central station for controlling said last named means, and compensating means operatively connected to the gun motors for imparting complementary displacements to the latter.

9. Apparatus for controlling one or more guns from a central station comprising, in combination, central station hydraulic means including a motor, a hydraulic motor operatively connected to each of the guns to be controlled, a pump for delivering liquid to each of said motors, means for actuating said pumps, means for controlling the volume of liquid delivered by each of said pumps to each motor, said last named means including a manually operable member positioned at the control station, a distributor actuated by said control member and motion transmitting means operatively connected to said distributor, and compensating means operatively connected to the control motor for each gun whereby complementary displacements may be imparted to the latter.

10. A distant control apparatus for one or more guns comprising, in combination, a central station hydraulic motor, a hydraulic motor operatively connected to each of said guns, pumps for delivering liquid to each of said motors, means for actuating each of said pumps, means for controlling the volume of liquid delivered by each pump to each motor, said last named means including a manually operable member, means for maintaining said member in a predetermined position, distributor means operatively connected to said member and power transmitting means operatively connected to said distributor and each of said pumps, and means operatively connected to the motor for each gun for imparting complementary displacements to the latter.

In testimony whereof I have signed this specification.

NICOLAS EMILIEN METHLIN.